(12) United States Patent
Chen et al.

(10) Patent No.: US 10,235,066 B1
(45) Date of Patent: Mar. 19, 2019

(54) JOURNAL DESTAGE RELAY FOR ONLINE SYSTEM CHECKPOINT CREATION

(71) Applicant: EMC IP Holding Company LLC, Hopkinton, MA (US)

(72) Inventors: Xiangping Chen, Sherborn, MA (US); Anton Kucherov, Milford, MA (US); Ying Hu, Northborough, MA (US); Felix Shvaiger, Brighton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 61 days.

(21) Appl. No.: 15/499,293

(22) Filed: Apr. 27, 2017

(51) Int. Cl.
*G06F 3/06* (2006.01)
*G06F 12/10* (2016.01)

(52) U.S. Cl.
CPC .......... *G06F 3/0619* (2013.01); *G06F 3/0608* (2013.01); *G06F 3/0631* (2013.01); *G06F 3/0683* (2013.01); *G06F 12/10* (2013.01); *G06F 2212/65* (2013.01)

(58) Field of Classification Search
CPC .... G06F 3/0608; G06F 3/0619; G06F 3/0631; G06F 3/0683; G06F 12/10; G06F 2212/65
See application file for complete search history.

(56) References Cited

U.S. PATENT DOCUMENTS

| 8,990,495 | B2 | 3/2015 | Hallak et al. |
| 9,087,006 | B2 | 7/2015 | Yochai et al. |
| 9,104,326 | B2 | 8/2015 | Frank et al. |
| 9,606,870 | B1 | 3/2017 | Meiri et al. |
| 2015/0193315 | A1* | 7/2015 | Cheong ............... G06F 11/1451 711/162 |

OTHER PUBLICATIONS

U.S. Appl. No. 15/499,951, filed Apr. 28, 2017, Chen et al.
Burtsev et al.; "Transparent Checkpoints of Closed Distributed Systems in Emulab"; University of Utah, School of Computing; Apr. 2009; Retrieved from https://www.ics.uci.edu/~aburtsev/doc/checkpoint-eurosys09.pdf; 14 pages.

(Continued)

*Primary Examiner* — Aracelis Ruiz
(74) *Attorney, Agent, or Firm* — Daly, Crowley Mofford & Durkee, LLP

(57) ABSTRACT

A storage system comprising a processor in operable communication with a storage device is configured to have first, second, and third tables and first, second, and third respective metadata journals storing time-based information associated, respectively, with the first, second, and third tables. The first table maps logical addresses associated with LUNs associated with the storage device to respective hash digests computed based on data residing at respective logical addresses. The second table maps a range of hash digests to respective associated physical locations on the storage device. The third table maps disk block allocation on the storage device. An online system checkpoint is created, comprising information relating to the state of the storage system at a point in time, where the first, second, and third, metadata journals are destaged in order so as to destage information stored in the respective journal up to the point in time.

20 Claims, 10 Drawing Sheets

(56) References Cited

OTHER PUBLICATIONS

Al-Kiswany et al.; "stdchk: A Checkpoint Storage System for Desktop Grid Computing"; The University of British Columbia; Jun. 17, 2008; 12 pages.

"Offline Checkpoints"; Perforce; Retrieved from http://answers.perforce.com/articles/KB/2419; Apr. 13, 2017; 3 pages.

* cited by examiner

US 10,235,066 B1

JOURNAL DESTAGE RELAY FOR ONLINE SYSTEM CHECKPOINT CREATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application relates at least generally to devices, systems, and methods for data storage in computer systems. More particularly, this application relates at least to ways to improve consistency in data system recovery.

BACKGROUND

Computer data is vital to today's organizations, and content addressable storage systems (such as DELL EMC XTREMIO) (hereinafter "XtremIO") can support a rich set of advanced data services such as single data instance, compression, snapshots, etc., by decoupling storage access, logical volume address space, and physical on-disk location of data. In systems such as this, volume and physical layout metadata can offer tremendous flexibility in decoupling and virtualization.

In network environments where high-availability is a necessity, system administrators are constantly faced with the challenges of preserving data integrity and ensuring availability of critical system components, such as data systems and file systems. A significant part of protection of computer data against disasters is focused on data protection and on providing ways for computer systems to recover from disasters and other disruptions. Storage systems sometimes experience failures. For example, a storage device, such as a disk drive, may malfunction making the data stored therein inaccessible (at least temporarily). In addition, data stored on a storage system may become corrupted. To protect against data loss as result of data corruption, file system corruption, and/or hardware failure, storage systems frequently use one or more protection strategies, such as mirroring and use of RAID (Redundant Array of Independent Disks).

Mirroring can include maintaining a copy of data stored on a storage device on one or more other storage devices. RAID can include striping data across a plurality of storage devices, and an additional storage device stores parity information for the data. Thus, if one of the storage devices fails, the parity information may be used to recover the portion of the data stored on the failed storage device. Likewise, if a portion of the data becomes corrupted, the parity information may be used to correct the data. Other RAID strategies involve rotating the parity information across all storage devices or striping the data across multiple storage devices without storing any parity information.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

In certain embodiments, a computer-implemented method is provided. A storage system is configured, the storage system comprising configuring a storage system comprising a processor in operable communication with a storage device, the storage system responsive to input/output (I/O) requests to the storage device from a host in operable communication with the storage system. First, second, and third tables and first, second, and third respective metadata journals associated with the first, second, and third, tables, are configured on the storage system.

The first table maps a first respective logical address associated with a first respective logical unit number (LUN) associated with the storage device to a corresponding first respective hash digest, the first respective hash digest computed based at least in part on data that resides at the first respective logical address. The first metadata journal comprises first metadata configured to store information associated with time-based changes to information stored in the first table.

The second table maps a first range of respective hash digests to respective associated physical locations on the storage device. The second metadata journal comprises second metadata configured to store information associated with time-based changes to information stored in the second table.

The third table comprises a mapping indicative of whether or not a given disk block on the storage device is allocated. The third respective metadata journal comprises third metadata configured to store information associated with time-based changes to information stored in the third table.

While the storage system is online and responsive to I/O requests from the host, an online system checkpoint is created, the online system checkpoint comprising information relating to the state of the storage system at a first point in time. The creation of the checkpoint comprises creating a plurality of consistent snapshots of the storage system at the first point in time, and destaging, in order, the first metadata journal, the second metadata journal, and the third metadata journal, wherein each destaging is configured to destage information stored in the journal up to the first point in time.

In certain embodiments destaging the first metadata journal further comprises: suspending, before destaging the first metadata journal begins, at least one activity capable of changing the content of the first metadata journal; destaging the first metadata journal; changing the mapping in the first table to point instead to a first respective artificial hash digest, the first respective artificial hash digest associated with a respective first version of the artificial hash digest, whereby the contents of the first metadata journal that was destaged are protected from alteration after the checkpoint is created; and resuming the at least one activity capable of changing the content of the first metadata journal.

In certain embodiments, a predetermined respective artificial hash digest is defined to be a default version of the first respective hash digest, and, after the first metadata journal is destaged, the mapping in the first table is modified to point instead to the default version of the first respective hash digest.

In certain embodiments, a system is provided, comprising a processor and a non-volatile memory in operable communication with the processor and storing computer program code that when executed on the processor causes the processor to execute a process operable to perform certain operations. In one operation, a storage system is configured, the storage system responsive to input/output (I/O) requests to the storage device from a host in operable communication with the storage system. In one operation, first, second, and third tables and first, second, and third respective metadata journals associated with the first, second, and third, tables, are configured on the storage system.

The first table maps a first respective logical address associated with a first respective logical unit number (LUN) associated with the storage system to a corresponding first respective hash digest, the first respective hash digest computed based at least in part on data that resides at the first respective logical address. The first metadata journal comprises first metadata configured to store information associated with time-based changes to information stored in the first table.

The second table maps a first range of respective hash digests to respective associated physical locations on the storage device. The second metadata journal comprises second metadata configured to store information associated with time-based changes to information stored in the second table.

The third table comprises a mapping indicative of whether or not a given disk block on the storage device is allocated. The third respective metadata journal comprises third metadata configured to store information associated with time-based changes to information stored in the third table.

While the storage system is online and responsive to I/O requests from the host, an online system checkpoint is created, the online system checkpoint comprising information relating to the state of the storage system at a first point in time. The creation of the checkpoint comprises creating a plurality of consistent snapshots of the storage system at the first point in time; and destaging, in order, the first metadata journal, the second metadata journal, and the third metadata journal, wherein each destaging is configured to destage information stored in the journal up to the first point in time.

Details relating to this and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1A:
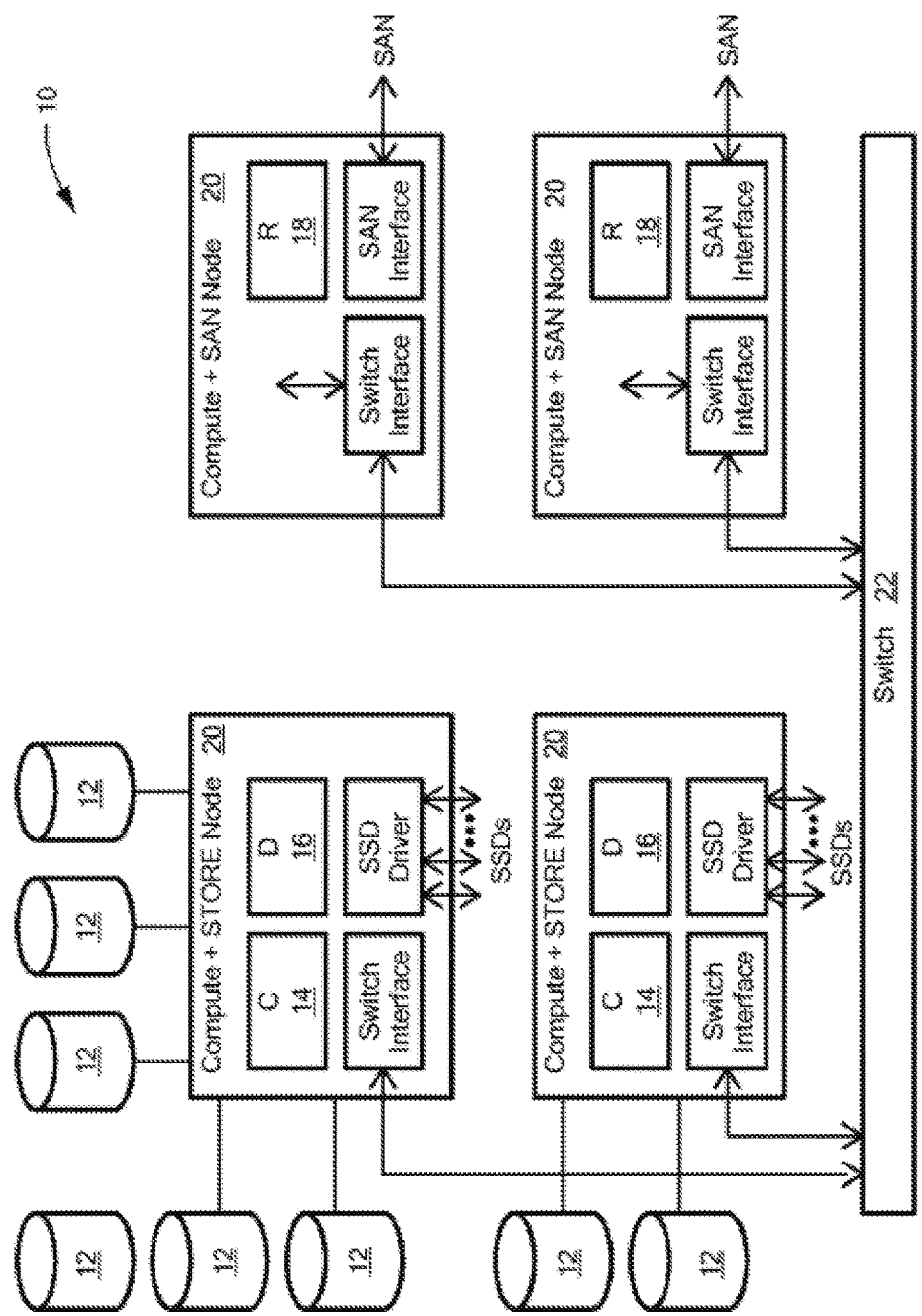
FIG. 1A is a simplified diagram schematically illustrating a distributed storage system for data storage, having separate control and data planes, in accordance with at least one illustrative embodiment of the disclosure.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, an X-page is a predetermined-size aligned chunk as the base unit for memory and disk operations. In certain embodiments described in the present description, the X-Page size is referred to as having 4 KB; however other smaller or larger values can be used as well, and nothing in the design is limited to a specific value.

In certain embodiments, a logical X-page address is the logical address of an X-page, containing a LUN identifier as well as the offset of the X-page within the LUN.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

It is envisioned that at least some embodiments herein are usable with one or more of the embodiments described in certain commonly owned U.S. patents, including: U.S. Pat. No. 8,990,495 ("Method and System for Storing Data in RAID Memory Devices"); U.S. Pat. No. 9,104,326 ("Scalable Block Data Storage Using Content Addressing") (hereinafter "'326 patent"); and U.S. Pat. No. 9,606,870 ("Data Reduction Techniques in a Flash-Based Key/Value Cluster Storage"), each of which is hereby incorporated by reference.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A illustrates a system 10 for scalable block data storage and retrieval using content addressing, which is usable in accordance with certain embodiments described herein. The system 10 includes data storage devices 12 on which the data blocks are stored. The storage devices 12 are networked to computing modules, there being several kinds of modules, including control modules 14 and data modules 16. The modules carry out content addressing for storage and retrieval, and the network defines separate paths or planes, control paths or a control plane which goes via the control modules 14 and data paths or a data plane which goes via the data modules 16.

The control (C) modules 14 may control execution of read and write commands. The data (D) modules 16 are connected to the storage devices 20 and, under control of a respective control module, pass data to or from the storage devices. Both the C and D modules 14, 16, respectively, may retain extracts of the data stored in the storage device, and the extracts may be used for the content addressing. Typically the extracts may be computed by cryptographic hashing of the data, as will be discussed in greater detail below, and hash modules (H) (FIG. 2) may specifically be provided for this purpose. That is to say the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the system 10. The routing modules 18 may use hash values, calculated from data associated with the operations, to select the control module for the distribution. More particularly, selection of the control module may use hash values, but typically relies on the user address and not on the content (hash). The hash value is, however, typically used for selecting the Data (D) module 16, and for setting the physical location for data storage within a D module 16.

The storage devices 12 may be solid-state random access storage devices, as opposed to spinning disk devices; however disk devices may be used instead or in addition. A deduplication feature may be provided. The routing modules 18 and/or data modules 16 may compare the extracts or hash values of write data with hash values of already stored data, and where a match is found, simply point to the matched data and avoid rewriting. The modules are combined into nodes 20 on the network, and the nodes are connected over the network by a switch 22.

The use of content addressing with multiple data modules selected on the basis of the content hashing, and a finely grained mapping of user addresses to Control Modules, allows for a scalable distributed architecture.

Figure 1B:
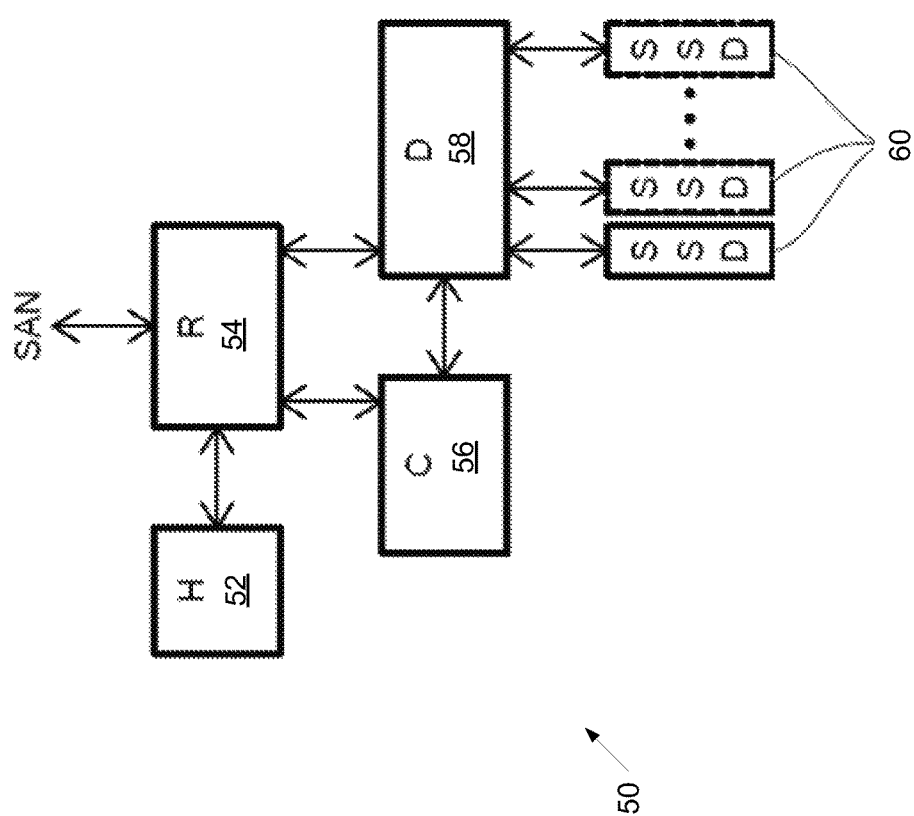
FIG. 1B is an exemplary configuration of modules for the distributed storage system of FIG. 1, in accordance with at least one illustrative embodiment of the disclosure.

FIG. 1B is a functional block diagram of a system 50 in which a Hash (H) module 52 is connected to a routing (R) module 54. The R module 54 is connected to both Control 56 and data 58 modules. The data module 58 is connected to any number of memory devices (e.g., solid-state devices (SSD)) 60.

A function of the H module 52 is to calculate the Hash function value for a given block of data, e.g., data which is the subject of storage commands. The hash values calculated may later be used for retrieval. The Hash function may be based on standards based hash functions such as SHA-1 and MD5, or based on a proprietary function, but this is not limiting. The hash function is selected, in certain embodiments, to generate a uniformly distributed output over the range of potential input values. In certain embodiments, H modules 52 share nodes with an R module 54, but that is not limiting. More generally, the H modules 52 can reside in certain nodes, in all nodes, together with R modules 54, or together with C modules 56 or D modules 58.

A function of the R module 54 is to terminate storage area network (SAN) Read/Write commands and route them to appropriate C and D modules 56, 58, for execution by these modules. By doing so, the R module 54 can distribute workload over multiple C and D modules 56, 58, and at the same time create complete separation of the Control and Data planes, that is to say provide separate control and data paths. In certain embodiments, the R module 54 routes SCSI I/O request to the C modules 56, guarantees execution, and returns the result. In certain embodiments, the R module 54 maintains an up to date data structure called an address-to-control module (A→C or A2C) table, coordinated with the management back end (MBD), indicating which C module 56 is responsible for each logical X-page address (LXA), and also showing a balance a range of all possible LXAs between available C modules 56. In certain embodiments, for write operations, the R module 54 instructs the calculation of a hash digest for each X-page by requesting such calculation from a hash calculation module (e.g., the H module 52).

A function of the C module 56 is to control the execution of a Read/Write (R/W) command, as well as other storage functions implemented by the system. The C module 56 also may maintain and manage key metadata elements. In certain embodiments, the C module 56 receives an I/O request from an R module 54 on a certain sub-LUN (SL), guaranteeing its atomic execution (i.e., execution independent of other processes) and returns the result to the R module 54. The C module 56 also communicates with D modules 58 to execute the I/O requests. In addition, the C module 56 monitors the disk content of its logical space by associating each LXA with its hash digest; and balances the work load between the D modules for the SLs that the C module 56 is maintaining. The C module 56 and data module 58 each maintains certain data structures and corresponding metadata journals for those data structures. For example, the C module 56 maintains an "address to hash" table (A2H table, also referred to herein as A→H table) and corresponding A2H metadata journal, in the C module 56. The D module 58 maintains the "hash to physical location of data" table (H2P table, also referred to herein as H→P table) and its corresponding metadata journal in the D module 58. That is, in certain embodiments, the in-memory copy of a journal is in the same module as the corresponding metadata table. In certain embodiments, the on-disk journal copy is persisted and mirrored across nodes in the cluster in journal disk chunks.

The A2H table maps each LXA that belongs to the SLs that the C module 56 is responsible for, to the hash digest representing the X-page Data that currently resides in that address. The C module 56 maintains an A2H table in a persistent way. The C module 56 may initiate requests to D modules 58 in order to save table pages to disk and read them from disk. In addition, to avoid frequent disk operations, the C module 56 maintains a journal certain of the latest table operations. These journals include (but are not limited to) the A2H metadata journals (A2H Hash tree) and dirty tree update metadata journals. As discussed below, the data module (D) takes charge of Hash Metadata (HMD), physical layout (PL) metadata, hash to physical layout (H2P) mapping, H2P metadata journals, on disk block allocation (3WBM) and disk block allocation bitmap (3WBM) journals, as discussed further herein. For example, in certain embodiments, the metadata journals include information associated with time-based changes to information in the respective A2H and H2P tables and time based changes to the disk block allocation bitmap.

The H2P table maps each range of hash digests to the corresponding D module 58 responsible for that range. The H2P table balances the range of all possible hash digests between the available D modules 58.

A function of the D module 58 is to perform the actual R/W operation by accessing the storage devices 60 attached to it. The D module 58 may maintain metadata related with the physical location of data blocks. In certain embodiments, the D module 58 is responsible for: maintaining a set of LUNs which are attached locally and performing all I/O operations on these LUN; managing the physical layout of the attached LUNs; managing the mapping between X-Page Data hash digests and their physical location in a persistent way; managing deduplication of X-Page Data in a persistent way; and receiving disk I/O requests from C modules 56, perform them and returning a result.

In certain embodiments, the D module 58 is also responsible for, for each write operation, backing up the X-Page Data in the designated D backup module and performing read-modify operations for writes that are smaller than X-Page size (This process also involves, in certain embodiments, computing a hash digest for these X-Pages). In certain embodiments, the D module 58 maintains an up-to-date H→(D, $D_{backup}$) table coordinated with the MBE, where the H→(D, $D_{backup}$) table is expected to balance the range of all possible hash digests between the available D modules 58.

Balancing between the D modules is based on hashing of the content. For example, in certain embodiments, the D module 58 makes use of a hash digest metadata table. The hash digest meta data table maps each in use hash digest, that represents actual X-Page Data, to its meta data information including its physical page on the storage media (SSD), its memory copy (if exists), a mapping to any backup memory copy and a reference count for the purpose of deduplication. The D modules 58 manage a separate nonvolatile memory pool (NVRAM or UPS protected) for X-Page Data backup purposes. The backup holds X-Pages that are held in memory of the D primary and have not yet been destaged. This is an example of the user data destage cache (UDC). There are dirty X-pages waiting to be persisted on disk. When re-balancing between D modules 58 occurs (due to a D module 58 failure for example), the D module 58 may communicate with other D modules 58 in order to create new backup copies or move a primary ownership as required.

The D modules 58 allow deduplication per X-Page Data by maintaining a persistent reference count that guarantees only one copy per X-Page Data. The D modules 58 manage the hash digest metadata table in a persistent way. The table is coordinated with the physical layout for physical pages allocation, with the memory pointer, memory backup pointer, and deduplication reference count.

As will be appreciated, the R, C, D, and H modules 52-58 may be implemented in software, and executed on a physical node. In addition, the aforementioned '326 patent provides information relating to additional functionality of the R, C, D, and H modules 52-58, in certain embodiments.

Figure 1C:
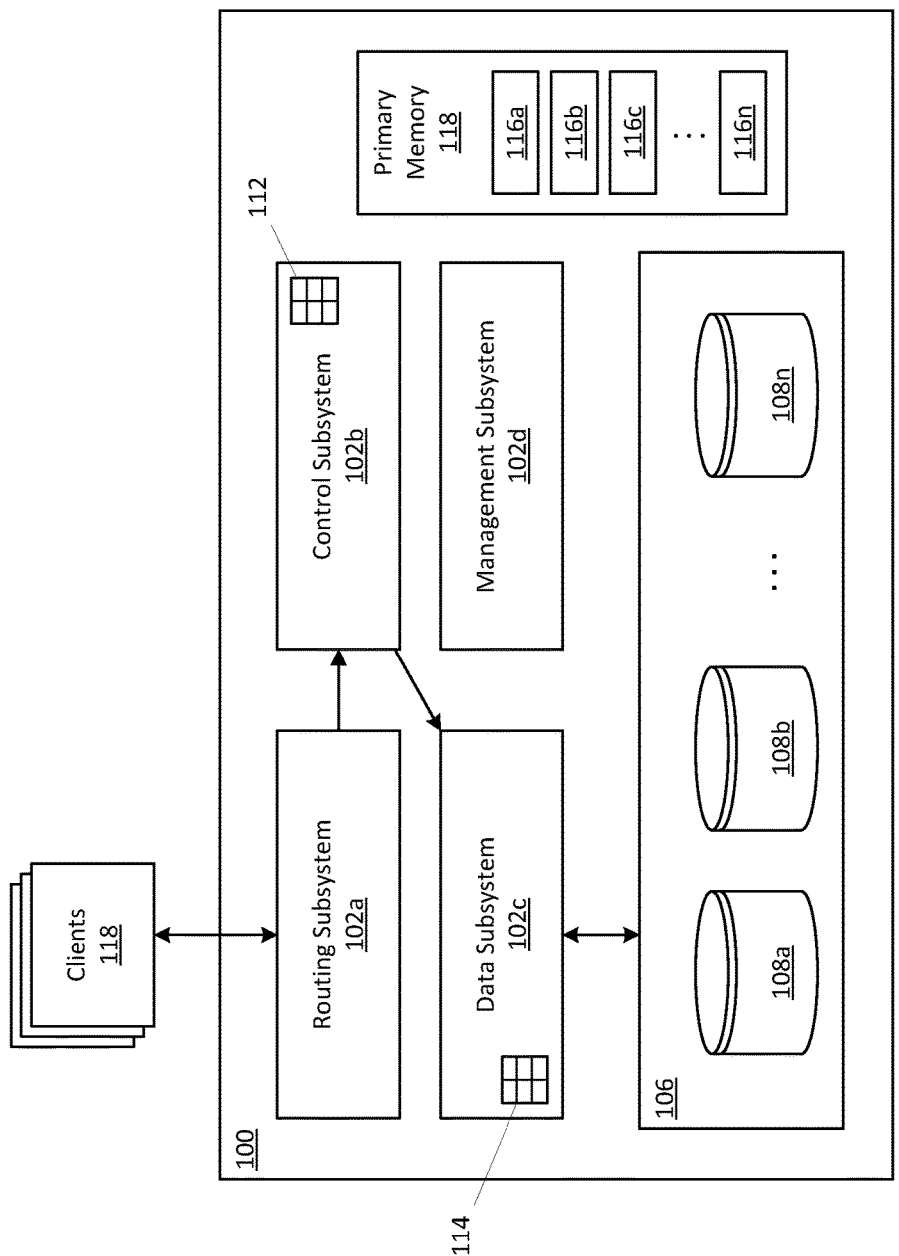
FIG. 1C is a simplified block diagram showing a storage system in accordance with at least one illustrative embodiment of the disclosure.

FIG. 1C shows a storage system 100 according to an illustrative embodiment of the disclosure. The storage system 100 may be the same as or similar to a node 20 within the distributed storage system 10 of FIG. 1A and/or the system 50 of FIG. 1B. The storage system 100 may include a plurality of subsystems 102a-102d (generally denoted 102 herein), a storage array 106 comprising a plurality of storage devices 108a . . . 108n (generally denoted 108 herein), and a primary memory 118. In some embodiments, the storage devices 108 may be provided as random access storage devices, such as solid-state devices (SSDs).

The primary memory 118 can be any type of memory having access times that are significantly faster compared to the storage devices 108. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM.

In the embodiment shown, the subsystems 102 include a routing subsystem 102a, a control subsystem 102b, a data subsystem 102c, and a management subsystem 102d. In one embodiment, subsystems 102 may be provided as software components, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, the subsystems 102 may be provided, at least in part, as hardware, such as digital signal processor (DSP) or an application specific integrated circuit (ASIC) configured to perform functionality described herein.

The routing subsystem 102a may be configured to receive I/O operations from clients 118 using, for example, an external application-programming interface (API) and to translate client I/O operations into internal commands. In some embodiments, the routing subsystem 102a is configured to receive commands from small computer system interface (SCSI) clients 118. In certain embodiments, the system 100 may store data in fixed-size chunks, for example 4K chunks, where each chunk may have a unique hash value (referred to herein as a "chunk hash," which in certain embodiments is the same as a hash digest). In such embodiments, the routing subsystem 102a may be configured to split data into fixed-size chunks and to calculate the corresponding chunk hashes. In one embodiment, chunk hashes are calculated using Secure Hash Algorithm 1 (SHA-1) processing. In some embodiments, a chunk corresponds to a fixed number of contiguous blocks within a storage device.

The control subsystem 102b may be configured to maintain a mapping between I/O addresses associated with data and the corresponding chunk hashes. As shown in FIG. 1C, this mapping may be maintained using a data structure 112, referred to herein as an "I/O address to chunk hash mapping table" or "A2H table," (also known as A→H table) according to some embodiments. In one embodiment, I/O addresses may be logical addresses used by clients 118 to access data within the storage system 100.

The data subsystem 102c may be configured to maintain a mapping between chunk hashes and physical storage addresses (i.e., storage locations within the storage array 106 and/or within individual storage devices 108). This mapping may be maintained using a data structure 114, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout, In certain embodiments, the H2P table is maintained to route data with different hashes to different D modules. The data subsystem 102c may be also be configured to read and write data from/to the storage array 106 (and/or to individual storage devices 108 therein).

It will be appreciated that combinations of the A2H 112 and H2P 114 tables may provide multiple levels of indirection between the logical (or "I/O") address a client 118 uses to access data and the physical address where that data is stored. Among other advantages, this can give the storage system 100 freedom to move data within the storage array 106 without affecting a client's 118 access to that data (e.g., if a storage device 108 fails).

The management subsystem 102d may be configured to monitor and track the status of various hardware and software resources within the storage system 100. In some embodiments, the management subsystem 102d may manage the allocation of memory by other subsystems (e.g., subsystems 102a-102c) using techniques described below in conjunction with FIGS. 2-6. In some embodiments, the management subsystem 102d can also be configured to monitor other subsystems 102 (e.g., subsystems 102a-102c) and to use this information to determine when the storage system 100 may begin processing client I/O operations after a restart.

A subsystem 102 may store various types of information within primary memory 118. For example, the control subsystem 102b may store some or all of the information within the A2H table 112 in primary memory 118. Likewise, the control subsystem 102c may store some or all of the information within the H2P table 114 in primary memory 118. In some embodiments, subsystems 102 cache metadata within primary memory 118 to improve system performance. In some embodiments, a subsystem 102 may maintain a change journal to efficiently handle changes to metadata or other information. Such change journals may also be stored in primary memory 118. For example, in certain embodiments, a subsystem's dynamic memory requirements may include metadata used to process I/O operations. In other embodiments, metadata stored within a process memory space may include address-based metadata (e.g., information used within the A2H table 112 of FIG. 2) and hash-based metadata (e.g., information used within the H2P table 114 of FIG. 2). It will be appreciated that the actual amount of metadata used by a subsystem may depend on the client I/O patterns which, in general, are a priori unknown. Thus, in some embodiments, a fixed amount of memory is allocated to each subsystem for metadata and it is left to the subsystem (or its components) to utilize the memory as appropriate. In one embodiment, a subsystem 102 may require up to 128 GB of primary memory to function normally.

In various embodiments, the storage system 100 of FIG. 1C may utilize techniques described below in connection with FIGS. 2-8 to provide an online system checkpoint, including a process for destaging journals in a well-defined sequence. As described further herein, in each step of the sequence, a few types of the journals are destaged, and the environment is set up to ensure the consistency of those subset types of the journals during destage, as well as protect metadata already persisted on disk from overwritten. The approach described in connection with at least some embodiments herein, allows host I/O to be served while doing journal destage, and the destaged metadata can be used for recovery of a system from a certain point in time.

In some content addressable storage systems, such as the DELL EMC XtremIO product, it is not always possible to achieve straightforward mapping between how data is presented to a host, and how data are stored. Thus, when a system fails (e.g., due to hardware or software issues), the flexibility in decoupling and virtualization can result in complexity in recovery processes and difficulties in achieving consistency between data and various layers of metadata. This also can complicate the ability to generate usable and/or useful system checkpoints.

In addition, one of the most important functions of an external storage system such as the DELL EMC XtremIO product, is to provision storage to host and applications, often in the form of a logical volume. It is crucial to preserve data consistency of user volumes while creating an online system checkpoint, so that after checkpoint recovery, a given application can be restarted with minimum or no additional recovery effort. Content addressable systems such as XtremIO clusters are rich in metadata; with every module (Routing/Control/Data) along the data path performing a certain level of I/O mapping and conversion operations to enable a rich set of data services, as discussed above in connection with FIGS. 1A-1C. To maintain metadata consistency, almost every module maintains one or more types of metadata journals, and, in some configurations, different layers, or stacks within the system have their own respective journals.

Metadata Journals can be used to preserve the consistency between volume metadata and data so that, if there is a system failure and reboot, a persisted journal can be used for system recovery. Metadata journals also can be useful if there is a need to upgrade a system or perform some other task that has a risk of destabilizing the state or configuration of one or more system components. However, if a given journal fails to persist, or does not persist correctly, an administrator may have to use traditional approaches to system recovery, such as to restore from backup, or manually fix on disk metadata configuration and data. Those approaches can require taking system offline in a prolonged period time, extreme expertise in on disk data/metadata layout and content, or both. Even so, there is no guarantee that the system can be recovered if the configuration has changed/lost, or metadata failed to persist on-disk. Thus, having a stored image of the state of the system, for at least one point in time (advantageously, a point as close as possible prior to the destabilizing condition) can help to enable recovery.

One way of addressing at least some of these issues, in accordance with certain embodiments described further herein, is to create an online system wide checkpoint that maintains consistency among volume configuration, logical volume space, and physical data storage. In the case of a system failing to come up regularly due to data/metadata inconsistency, it can be easily recovered using a system wide checkpoint. Advantageously, in at least some embodiments described further herein, the creation of a system wide checkpoint can be totally transparent to user application without impact to normal host reads and writes.

Figure 2:
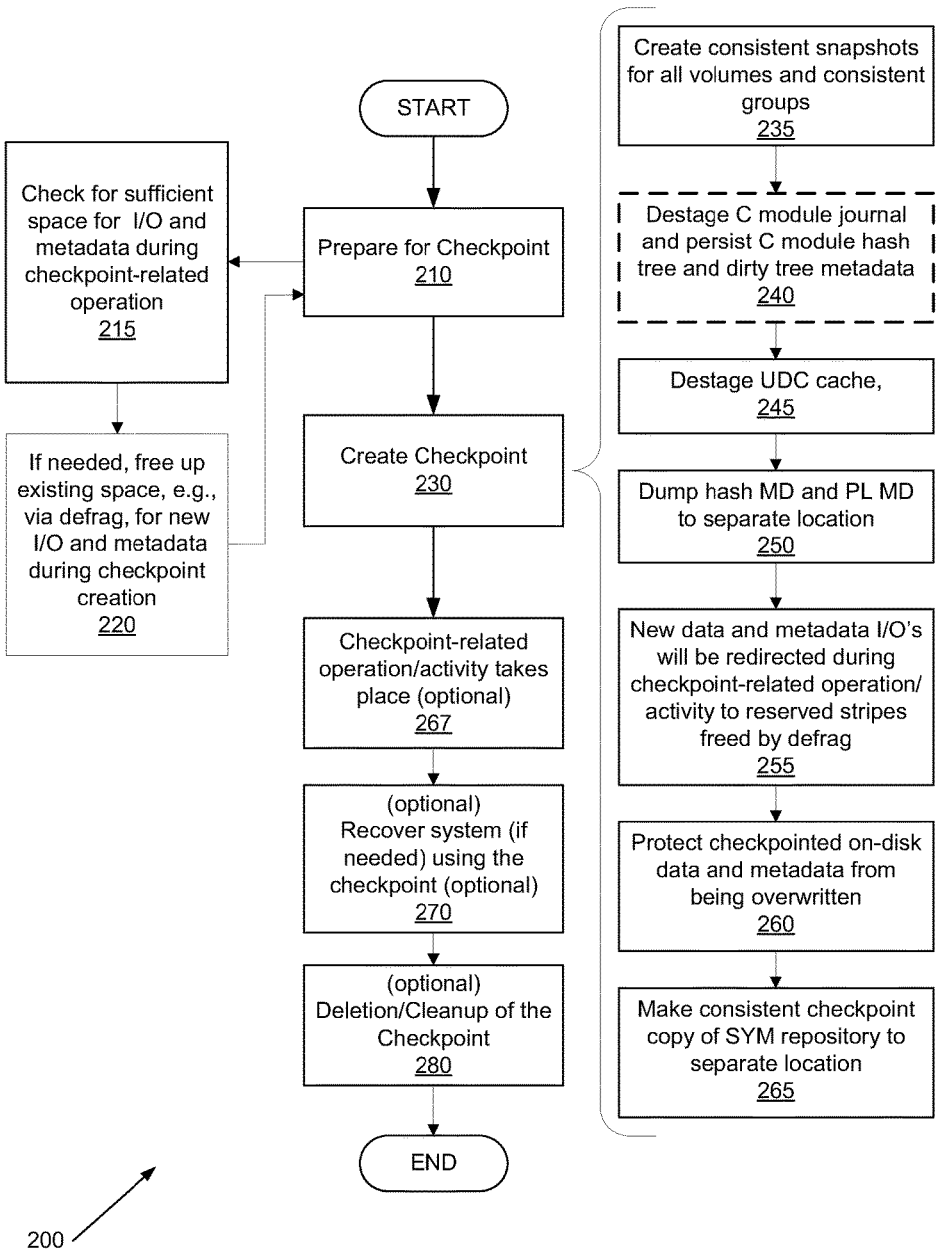
FIG. 2 is a first simplified flowchart of actions associated with creation of a system checkpoint for the systems of FIGS. 1A and 1C, in accordance with at least one illustrative embodiment of the instant disclosure.
Figure 3:
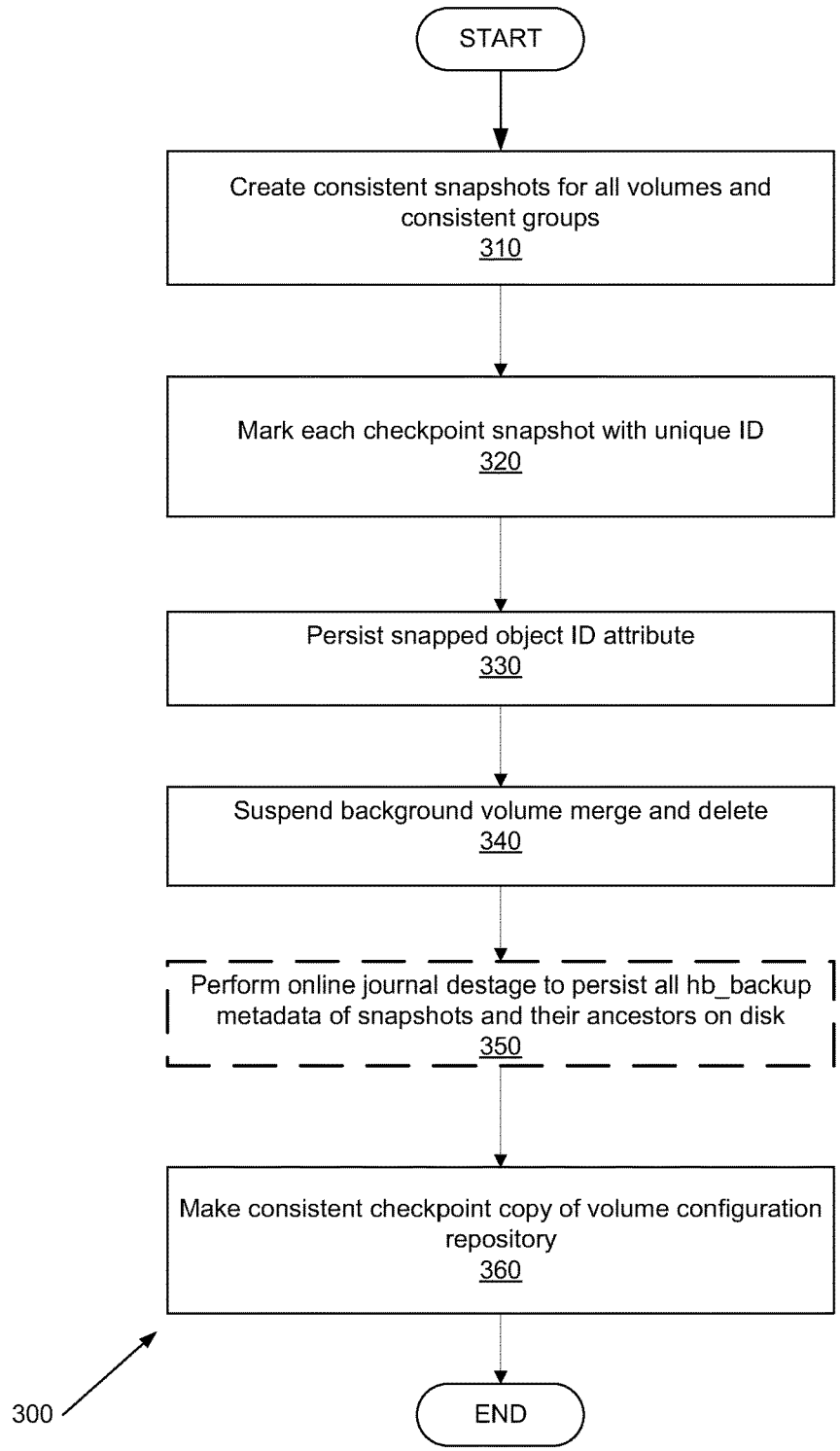
FIG. 3 is a second simplified flowchart of actions associated with creation of a system checkpoint for the systems of FIGS. 1A and 1C, in accordance with at least one illustrative embodiment of the instant disclosure.

FIGS. 2 and 3 are first and second simplified flowcharts, respectively for actions associated with creation of a system checkpoint for the systems of FIGS. 1A and 1C, in accordance with at least one illustrative embodiment of the instant disclosure. It is helpful in understanding the embodiments herein, to briefly summarize first the actions taken during creation of the system checkpoint, prior to describing the details of the sequence of destaging, which is one of the steps in these processes.

Referring first to FIG. 2, at a high level, the checkpoint life cycle consist of four key stages: preparation (block 210), creation (block 230), recovery/use of the checkpoint (block 270), and deletion/cleanup of the checkpoint (block 280), whether with recovery or without recovery. In certain further embodiments, in between creation of the checkpoint and recovery (if needed), using the checkpoint, an optional activity or action can occur (block 267) which activity necessitated the need for the checkpoint (e.g., software update, installation of new components, repair of the system, and the like). In certain embodiments, the operations of blocks 210-267 and 280 are run dynamically while the system (e.g., of any of FIGS. 1A-1C) is online, in an operating mode (e.g., is operating, running applications, etc.).

When a system (such as that of FIG. 1A or 2B), prepares for a checkpoint (block 210), to preserve the good state of previous point in time that is going to be used as a checkpoint, new I/O's that are received and metadata updates that take place while the checkpoint is being created, or that take place during the checkpoint-related operation or activity that may take place after the checkpoint is created, (block 267) and/or that come in any time from the time the checkpoint is created to the time the checkpoint is either used for restoration or deleted as no longer needed, need to be written to a separate area so that such I/O's and/or metadata updates won't overwrite the data and metadata that have been checkpointed.

It is assumed that a given system has sufficient space for the set of checkpoint data, which in an illustrative embodiment has a size of approximately 5% of total storage space size before checkpoint, but this is not limiting. In various embodiments, the check for size requirements can be based at least in part on any one or more of user-configurable or predefined absolute free space size, relative (% of total space) space size, space size sufficient for some (configurable or predefined) duration of time of system operation (if system has historical stats about space consumption rate), etc. As part of this preparation (block 210), a check is made (block 215) to check for sufficient/available space for I/O and metadata that are part of I/O during a checkpoint-related operation (i.e., during the operation that occurs after the checkpoint is made). If space is needed for the I/O and metadata, then to clear up (that is, to re-allocate space so that it is free) disk space to store the new I/O's and metadata updates that arise during and/or after checkpointing, a defragmentation process (block 220) needs to be run to free up and mark certain amount of available disk space (e.g., RAID group stripes) to prepare for checkpoint creation;

Note that, in certain embodiments, a "checkpoint operation" is not considered to be the creation of the actual checkpoint alone, but rather is defined as including the "potentially risky" operation or process that can take place after the actual checkpoint is created. A checkpoint operation can, in some instances, be considered to be an operation or process that may carry some risk to the stability of a given computer or storage system, and/or to the stability or integrity of data stored therein. Illustrative examples of checkpoint operations include, but are not limited to, operating system upgrades, new installations of hardware or software, repairs to a computer system, connecting a computer system or storage system to a new network, before making changes to configuration of a system, and the like. In certain embodiments, the checkpoint operation/activity can be an operation associated with a risk of undesired alteration to at least a portion of information stored in the set of system checkpoint information, or can be an operation, activity, or task that has a risk of destabilizing the state or configuration of one or more system components.

Referring again to FIG. 2, once the preparation is complete, the actual checkpoint is created (block 230). In certain embodiments, the checkpoint is created automatically. In certain embodiments, a user or other entity may instruct the system to create the actual checkpoint. A checkpoint contains, in certain embodiments, a consistent point in time image of the entire system, including configuration, logical volume mapping metadata, physical on disk data layout metadata, as well as the actual user data (e.g., in some embodiments, the user data of the user or other entity requesting the checkpoint). The creation of checkpoint (block 230) performs several steps to persist consistent image from all components, including:

(block 235): Create consistent snapshots for all volumes and consistent groups (FIG. 3, described further below, provides additional details on the operations for snapshot creation);

(block 240): Destage C module journal and persist C module hash tree and dirty tree metadata (this is discussed more fully herein in connection with FIGS. 4-6);

(block 245): Destage user data destage cache (UDC);

(block 250): Dump hash metadata (HMD) and physical layout (PL) metadata to a separate location, while still allowing new metadata updates to a system default location;

(block 255): Redirect new data and metadata I/O's to the stripes reserved during checkpoint preparation (i.e., in block 220);

(block 260): Protect checkpointed on-disk data and metadata; and (block 265): Make a consistent checkpoint copy of the SYM repository (i.e., the cluster management module) to a separate location.

After a checkpoint is created (block 230), a checkpoint operation, or other related checkpoint activity, takes place (block 267). During the recover block 270, once a checkpoint is created successfully, it can be used to start the system checkpoint. The flowcharts of FIGS. 2 and 3 do not include details of the recovery process, but in one embodiment it includes operations such as:

(a) Start the SYM using checkpoint SYM repository;
(b) Construct an in memory database based on the checkpoint SYM repository.
(c) In SYM, assign the SCSI volume ID identifier of production volumes to checkpoint snapshots:
(d) Delete the possibly corrupted production volumes;
(e) Load the Data module 16 (FIG. 1A) from the checkpoint copy of HMD and PL metadata;
(f) Recover all user data and logical volume metadata; and
(g) Load Control module 14 (FIG. 1A) based on recovered logical volume metadata.

The creation of the consistent snapshots (block 235 of FIG. 2) is described more fully in FIG. 3. In particular, certain embodiments described herein also help to address at least some of the need for maintaining volume data consistency by leveraging the advanced online snapshot technology and the capability of decoupling storage access object from storage data objects in modern storage arrays such as the XtremIO storage cluster. During online checkpoint creation, as explained below in connection with FIG. 3, the system creates consistent snapshots for all production volumes and consistent groups, and saves reference to host access attributes such as SCSI identity of a production volume along with its snapshot. At recovery time, the system rolls back the content of production volumes to checkpoint creation time by re-assigning the host access identity to snapshot volumes.

Referring now to FIG. 3, in block 310, the cluster management module, SYM, goes through all valid consistency groups (CG) and creates an online snapshot set for each one of them. The SYM then creates snapshots for each external volume that is not in a consistency group. In certain embodiments, if a volume is already part of a CG, there is no need to create checkpoint snapshot for itself, as it will get protected via CG snapshot. Such checkpoint snapshots are, in certain embodiments, read-only and internal; their data content are immutable once created. Each checkpoint is marked with a unique identifier (block 320). For example, in certain embodiments, a checkpoint snapshot set is marked as "created for checkpoint" with a unique checkpoint owner ID. In addition, each snapshot set persists the "snapped object ID" attribute (block 330), which is the source consistency group or production volume external ID, and can be used to re-assign volume identity later on. Background volume merge and delete are suspended (block 340). In certain embodiments, the C module (which handles logical volume mapping) does this, so that snapshots and their ancestor hb_backup metadata stay intact. In certain embodiments, the hb_backup metadata corresponds to the A2H metadata on-disk presentation, where the two names are used to represent/correspond to different in memory and on disk metadata format.

In block 350 (shown in dotted lines in FIG. 3), an online journal destage is performed to persist all hb_backup metadata of snapshots and their ancestors on disk (this process is further detailed in FIGS. 4-7 herein). In block 350, a consistent checkpoint copy of the volume configuration repository is made, to protect the volume configuration repository from data loss. In certain embodiments, this is done by the SYM.

Creation of a system checkpoint, in accordance with certain embodiments described herein, as noted in FIGS. 2 and 3, includes a process of destaging of information, such as journal pages (see, e.g., the blocks in dotted lines in FIGS. 2 and 3, namely blocks 240 and 350, and respectively). Destaging involves writing new or updated data from a cache or nonvolatile storage to a direct access storage device (e.g., a primary or backup storage device). To minimize metadata on disk amortization, a priority is sometimes established wherein the most active pages are destaged first. However, one issue that can arise from this is that so-called "dirty" pages may stay in memory for a very long time without being written to persistent storage.

As is understood, so-called "dirty" pages or data, as used herein, refers to data or pages that are part of a write operation and which are temporarily retained in cache space until it is later written to storage space. Once the "dirty" pages or data are sent to the storage space (i.e., once the temporarily retained data is destaged), the data is erased from cache memory and is then referred to as "clean" data. Thus, if during creation of a system checkpoint, the most active pages are destaged first, then inactive dirty pages might stay in memory for a long time without ever getting written to persistent storage. In certain embodiments, creation of a system checkpoint, as shown in the processes of FIGS. 2 and 3 requires destages of all the Journal pages of all types in the system up to a point in time, including the most inactive pages, so that there is a consistent metadata on disk image to recover from. Thus, the dirty pages, such as dirty metadata journals, need to be flushed out when a system checkpoint is created.

One challenge with flushing out dirty pages or other dirty information (e.g., the metadata journals) is that the destage operation, in certain embodiments, needs to be performed online (i.e., while the system and its applications are running, e.g., while the storage system is in an operational mode) with no impact to host applications, nor suspension of I/O, nor system timeout. Accordingly, at least some embodiments described herein provide one or more processes to perform a relay style journal destage that dumps metadata to disk safely with minimum impact to host I/O and other system activities.

Another challenge with flushing out information, such as metadata journals, is that there are a number of different types of journals that can be in a system (in some embodiments, such as those using XtremIO, there can be up to ten different types of journals). Some prior types of destaging of these journals happens independently and without a particular coordination or ordering—a process that can assume that the underlying system remains reliable, which is not always the case. Another challenge can be that prior methods of destage involve the underlying system relying on a so-called "idle" destage to flush metadata to disk. However, idle destage generally requires that a cluster has been idle for certain period of time, which is not always feasible for certain applications. If a cluster experiences power loss and battery unit failure in the middle of serving I/O, recovery from journal is very difficult if the on disk copy of journal and metadata is not consistent.

Figure 4:
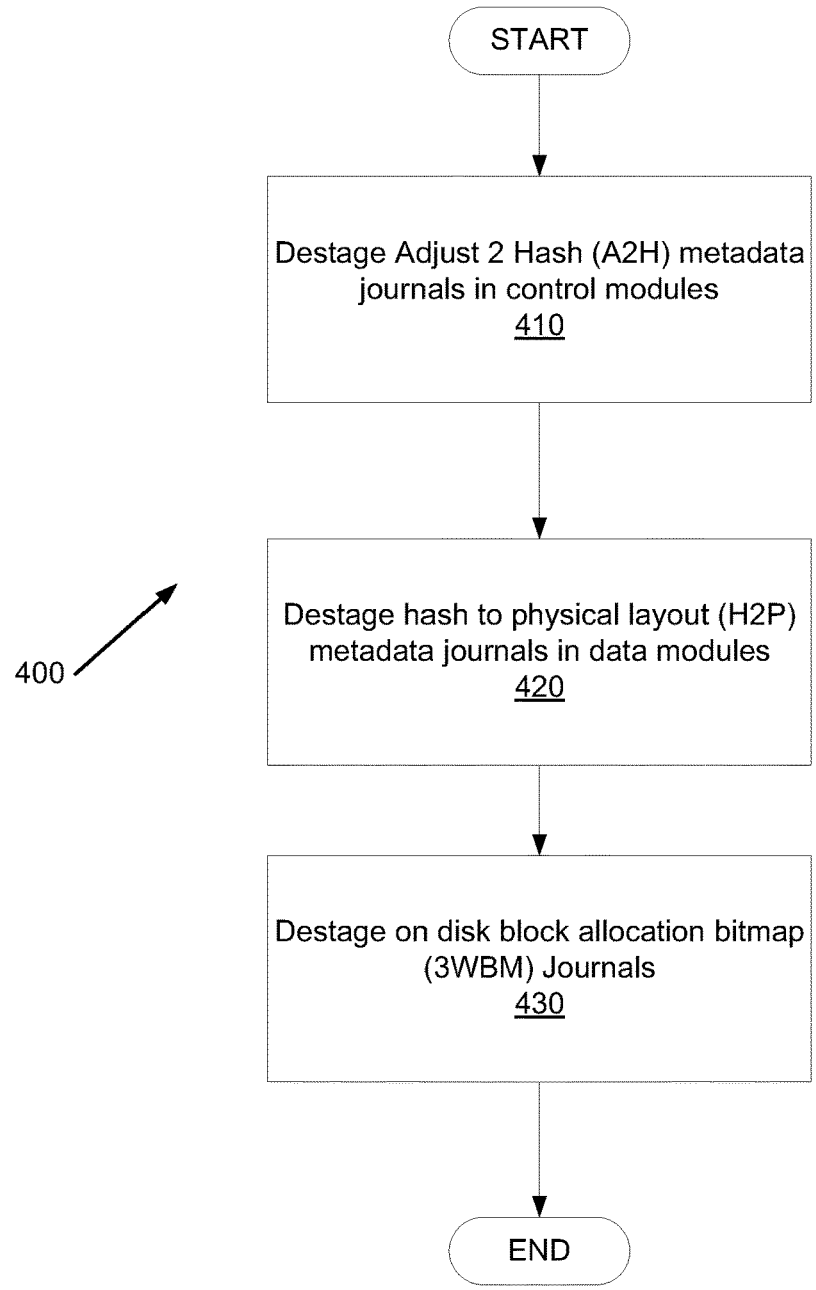
FIG. 4 is a simplified flowchart of actions occurring during the journal destage blocks of FIGS. 2 and 3, for the data storage system of FIGS. 1A and 1C, in accordance with at least one illustrative embodiment of the instant disclosure.
Figure 5:
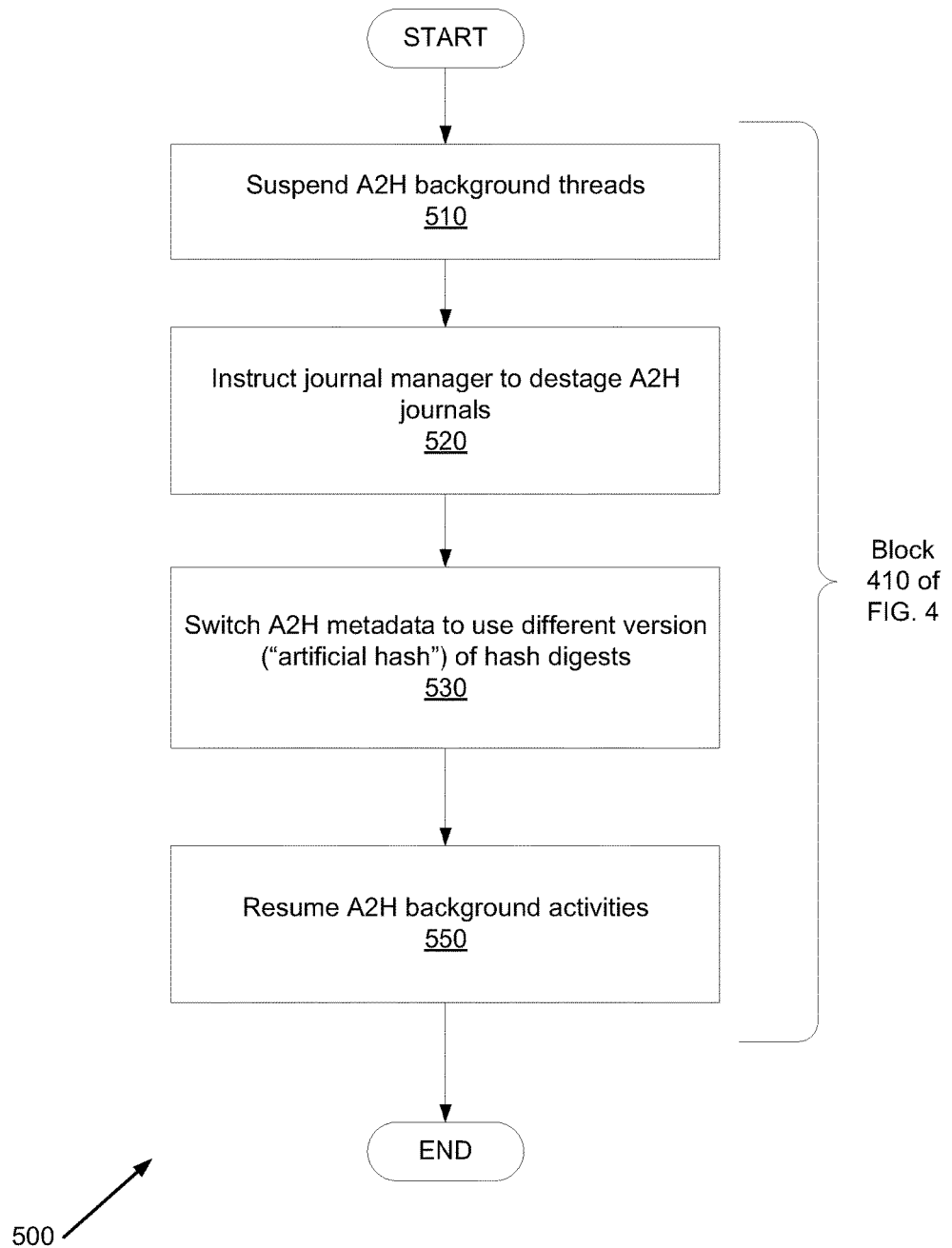
FIG. 5 is a simplified flowchart of actions occurring during a first action in the flowchart of FIG. 5, in accordance with at least one illustrative embodiment of the instant disclosure.
Figure 6:
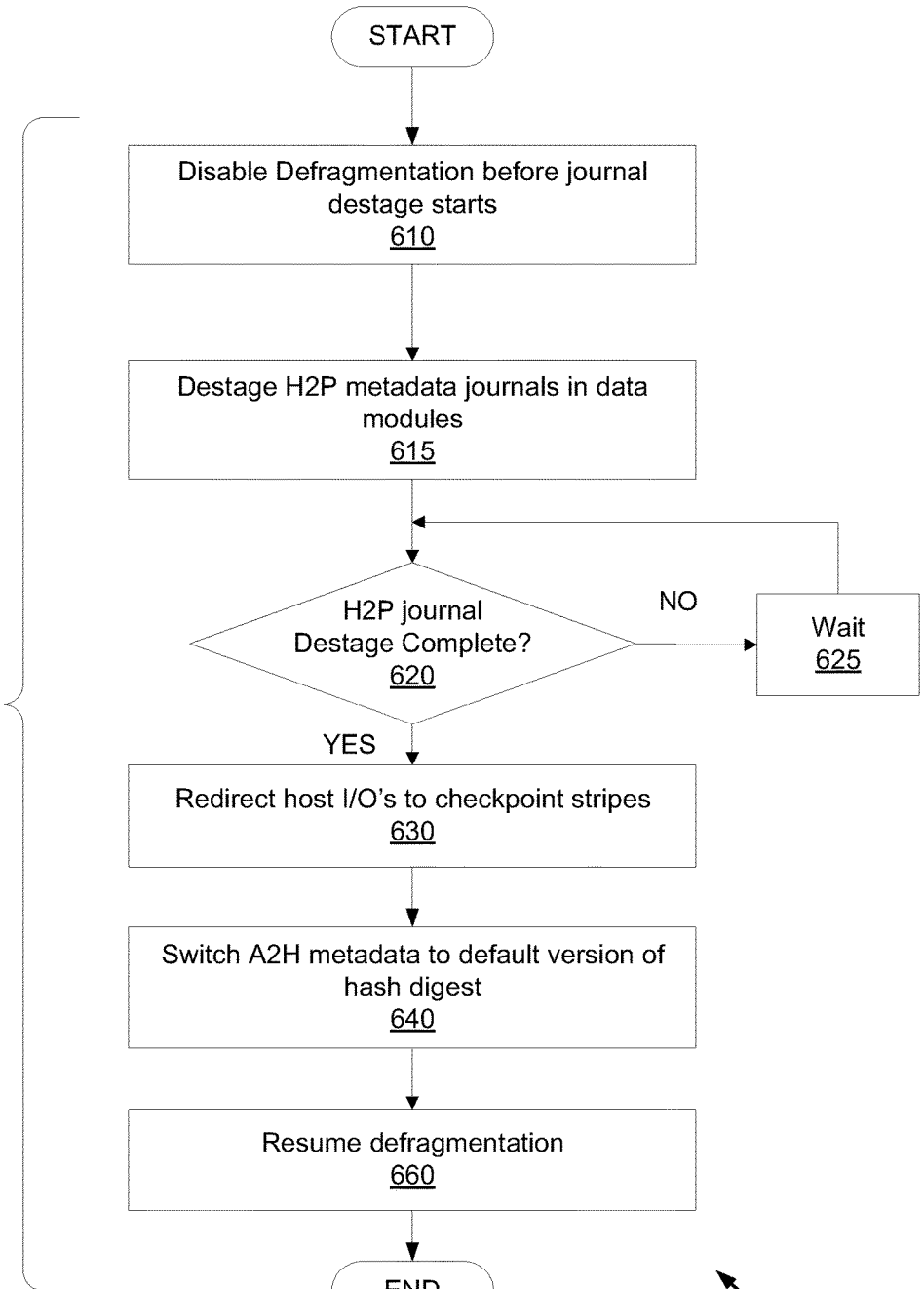
FIG. 6 is a simplified flowchart of actions occurring during a second action in the flowchart of FIG. 4, in accordance with at least one illustrative embodiment of the instant disclosure.
Figure 7:
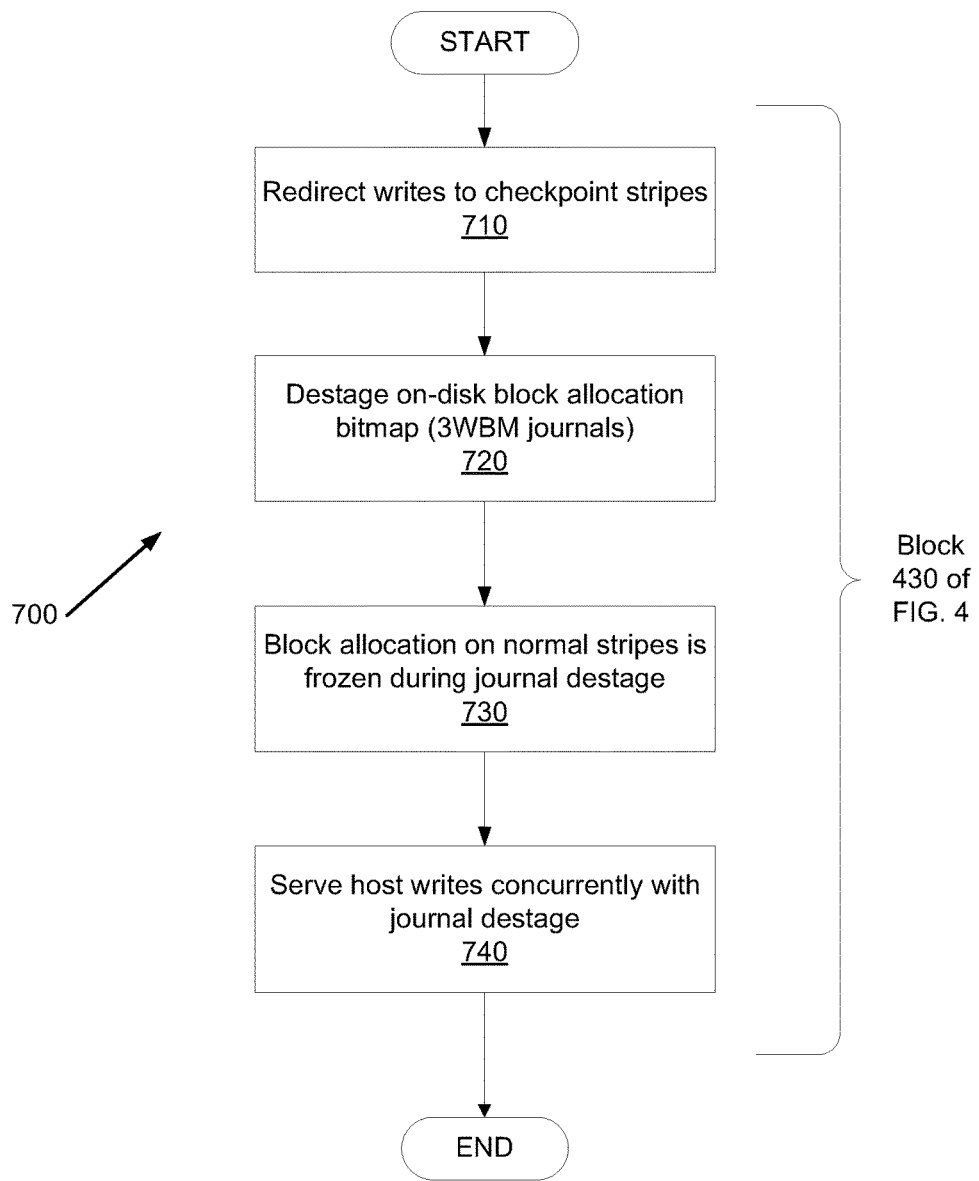
FIG. 7 is a simplified flowchart of actions occurring during a third action in the flowchart of FIG. 4, in accordance with at least one illustrative embodiment of the instant disclosure.

Thus, in certain embodiments, to help ensure that a consistent disk image and/or consistent journal is created, journal destage for online system checkpoint creation is performed in a well-defined sequence. FIG. 4 is a simplified high-level flowchart 400 of actions occurring during the journal destage blocks 240 and 350, respectively of FIGS. 2 and 3, respectively, for the data storage system of FIGS. 1A and 1C, in accordance with at least one illustrative embodiment of the instant disclosure. FIG. 5 is a simplified flowchart 500 of actions occurring during block 320 of the flowchart 400 of FIG. 4, in accordance with at least one illustrative embodiment of the instant disclosure. FIG. 6 is a simplified flowchart 500 of actions occurring during block 420 of the flowchart 400 of FIG. 4, in accordance with at least one illustrative embodiment of the instant disclosure. FIG. 7 is a simplified flowchart 700 of actions occurring during block 430 of the flowchart 400 of FIG. 4, in accordance with at least one illustrative embodiment of the instant disclosure.

Referring now to FIGS. 2-7, during checkpoint creation, a very important step is to destage various types of Journals in C and then D modules. Recall that for certain content addressable systems such as XtremIO, there are two layers of mapping: one for the address-to-hash (A2H) handle, and one for hash handle-to-physical disk location (H2P). In certain embodiments, the C module maps volume logical page address to hash handle (A2H) and maintains a snapshot volume tree. The C module needs to persist A2H metadata of checkpoint snapshot volumes for recovery. Thus, in certain embodiments, a first step in this sequence is to destage A2H metadata journals in control (C) modules (block 410).

The flowchart 500 of FIG. 5 provides more details on destaging A2H metadata in accordance with block 410. Referring briefly to FIG. 5, to destage A2H metadata journals consistently in C module, A2H background threads are first suspended (block 510) to prevent changes to the checkpoint snapshot volume metadata. Although snapshot volumes are read-only, background activities such as delete/merge can still change the metadata content, which can present a challenge if an attempt is made to destage a journal or create a consistent metadata image. If a decision were made not to suspend host I/O during creation of a checkpoint (i.e., if block 510 operation did not occur), then metadata will, inherently, always be changing. Even if a snapshot is created, the metadata for the snapshot also could be changed, because of delete or merge events, so it is advantageous to have a way to freeze or suspend at least background threads. Background threads, in certain embodiments, are threads that perform delete or merge operations and which potentially could change snapshot metadata. Even if a background thread is suspended, the system, in certain embodiments, still allows I/O's to arrive and still permits read and write operations. However, even with those actions, they have no effect on snapshot objects or the snap group tree hierarchy. This enables, in certain embodiments, an ability to have a window of destage of the metadata and an ability to create a disk metadata consistent image for the system checkpoint.

Referring again to FIG. 5, after background threads are suspended (block 410), the journal manager is instructed to destage the A2H journals (block 520). In certain embodiments, the SYM instructs the manager to do this.

After A2H journal destage (block 520), A2H metadata are switched to use a different version of hash digests, termed an "artificial hash," to prevent previously destaged A2H metadata from being overwritten (block 530). As is known, a hash function is any function that can be used to map data of arbitrary size to data of fixed size, where the values returned by a hash function are called hash values, hash codes, digests, or simply hashes. One use is as part of a data structure called a hash table, which can be used for rapid data lookup. In a Content Addressable Storage (CAS) array, such as XtremIO, data is stored in blocks, for example of 4 KB, where each block has a unique large hash signature, for example of 20 bytes, saved on flash memory. In certain embodiments, such hash signatures can be accessed by relatively small, in-memory handles (referred to as hash handles), for example having a size of 5 bytes. These hash handles can be unique to each array, but not necessarily unique across arrays. When replicating between two CAS arrays, it is much more efficient to use hash signatures instead of sending the full block. If the target already has the data block corresponding to the hash signature, there is no need to send the corresponding data.

The operation at block 530, however, is different than what happens in some known destaging of journals. Recall that the C module (FIGS. 1A and 1C) has its own mapping metadata. Thus, there is a need to assign a specific "hash handle" for the C module mapping metadata. From the point of view of the D module, the mapping metadata of the C module is the same as regular application data. Normally, for application data, a hash handle is calculated based on the content of the data. But, for metadata, the hash handle is calculated in accordance with specific rules, because the way that metadata gets updates is different than the way host data gets updated. In certain embodiments, when user data, is updated, a new hash digest is calculated and the data content is stored in a new disk location based on the new hash digest. The artificial hash handle of the C module metadata, however, is usually not changed. In certain embodiments, overwrites could be allowed to the same physical location when contents change. Thus, except in the case of system checkpoint, as described herein, it is useful to support different versions of artificial hash handles.

In certain embodiments, the hash digest is not used to generate the hash handle. Instead, a specific method, termed the artificial hash method, is used to calculate the hash handle value. In some implementations there are "artificial hash handles" which do not match (or hint) of the full hash signature. In certain embodiments herein, the artificial hash corresponds to a "different version" of the hash digest, and is used to prevent previously destaged A2H metadata from being overwritten after system checkpoint creation.

To support the system checkpoint, after the checkpoint is created, the metadata should not be overwritten. One way to accomplish this, in accordance with certain embodiments herein, is to implement versioning of the artificial hash handle (e.g., hashed metadata), which in certain embodiments is accomplished with the artificial hashes. Recall, as noted above, the C module associates each LXA with a corresponding hash digest via the A2H table, which maps each LXA (in the SLs for which a C module is responsible) to a hash digest representing X-page data that is at that address. Also as noted above, the C module maintains an A2H metadata journal of the latest table operations. Recall also that the D module manages the mapping between X-page data hash digests and their physical location in a persistent way.

In certain embodiments, versioning of the artificial hash handle (hashed metadata), via an artificial hash, helps to prevent the metadata in the A2H journal from being overwritten while the system checkpoint is being created. To implement a versioned hash digest, in one embodiment, the A2H table in the C module is modified to point, temporarily (e.g., during the time the checkpoint is being created and during checkpoint related operation/activity), to a versioned artificial hash digest as the default hash digest instead of pointing to what would be the regular hash digest, where the versioned artificial hash digest provides a different version of the hash digest. In some implementations there are "artificial hash handles" which do not match (or hint) of the full hash signature. In certain embodiments, the versioned artificial hash handles and corresponding metadata are persisted during checkpoint creation (block 230 of FIG. 2), and then converted or cleaned up after checkpoint delete/recovery (block 280 of FIG. 2).

In certain embodiments, versioning helps to prevent the A2H metadata from being written over after checkpoint creation. After checkpoint creation is complete, the A2h background activities are resumed (block 440) safely, because the versioning is preventing the metadata from being overwritten.

Referring again to FIG. 4, after the A2H metadata destage is complete (block 410), the next operation is to destage hash to disk physical layout (H2P) metadata journals in data (D) modules (block 420). Recall that the D module manages the configuration of hash to real data mapping, whereas the C module manages the address to hash mapping. The operations of block 420 are shown in greater detail in the flowchart 600 of FIG. 6.

Referring briefly to FIG. 6, before journal destage for the H2P starts, defragmentation is disabled (block 610) to avoid background on disk data movement and subsequent metadata changes. Then, the H2P journals can be destaged (block 615). Once H2P journal destage is complete (blocks 620-625), host I/O's are redirected to checkpoint stripes (block 630), so that checkpoint metadata and data won't be overwritten later on. Note that the I/O is redirected, in certain embodiments, to space that has been previously freed by the defragmentation operation of block 220 of FIG. 2). In certain embodiments, this redirection of host I/O is transparent to the host I/O.

At this point (block 640), A2H metadata can now be safely switched back to the default version of hash digest (i.e., the artificial hash version). In addition, with different versioning, in the D module, a complete copy is made of the associated metadata. Once that copy is made and stored, there is not an issue about it being overwritten. After A2H metadata is switched to the default version (block 640), defragmentation can be resumed safely (block 650).

Referring again to FIG. 4, after the H2P metadata journals have been destaged (block 420), the final operation is to destage on-disk block allocation bitmap (3WBM) journals (block 630). In certain embodiments, the on-disk block allocation bitmap indicates which disk blocks have been allocated (e.g., are currently being used) and which disk blocks have not been allocated. Thus, the 3WBM journal keeps a record of the disk block allocations and non-allocations at certain points in time. The flowchart 700 of FIG. 7 provides additional information on this operation. Referring to FIG. 7, because writes already are redirected to checkpoint stripes before this portion of the destage starts (block 710), when the destage of the 3WBM journals takes place (block 720), the block allocation on normal stripes is already is frozen during journal destage (block 720). That is, since it is known that the I/O's are being redirected to checkpoint stripes (instead of their normal locations), it can be assumed that there will be no more changes to the bitmap, because the current allocation is "frozen." Thus, host writes can be served concurrently with journal destage (block 740). In actuality, in certain embodiments, once the writes are redirected to checkpoint stripes, the host writes can be served.

In the above-described flow charts of FIGS. 2-7, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

Figure 8:
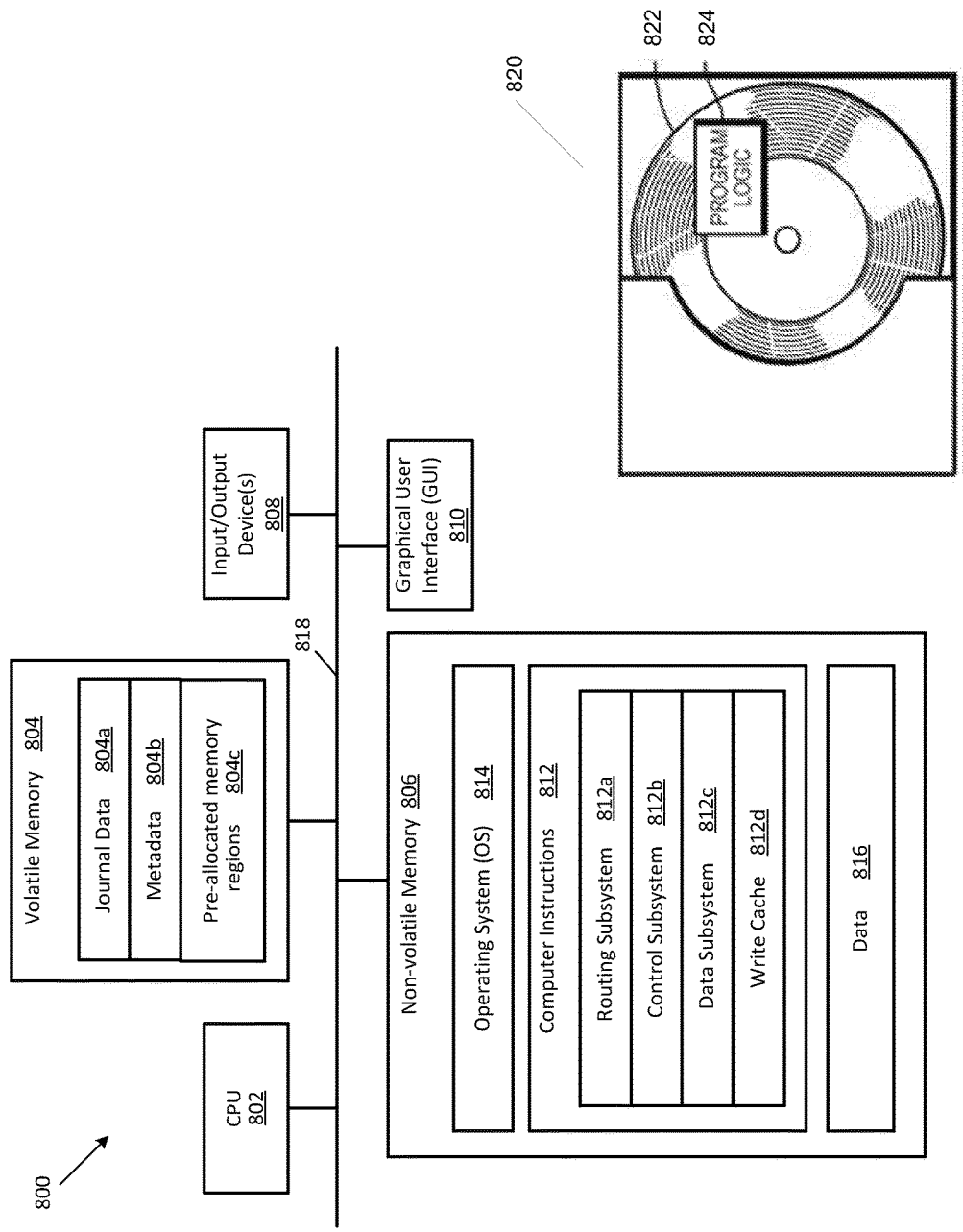
FIG. 8 is a simplified block diagram of an apparatus that may be used to implement at least a portion of the systems of FIGS. 1A-1C and at least a portion of the processes of FIGS. 2-7.

As shown in FIG. 8, computer 800 may include processor 802, volatile memory 804 (e.g., RAM), non-volatile memory 806 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 810 (e.g., a touchscreen, a display, and so forth) and input and/or output (I/O) device 808 (e.g., a mouse, a keyboard, etc.). Non-volatile memory 804 stores, e.g., journal data 804*a*, metadata 804*b*, and pre-allocated memory regions 804*c*. The non-volatile memory, 806 can include, in some embodiments, an operating system 814, and computer instructions 812, and data 816. In certain embodiments, the computer instructions 812 are configured to provide several subsystems, including a routing subsystem 812A, a control subsystem 812*b*, a data subsystem 812*c*, and a write cache 812*d*. In certain embodiments, the computer instructions 812 are executed by the processor/CPU 802 out of volatile memory 804 to perform at least a portion of the processes shown in FIGS. 4-6. Program code also may be applied to data entered using an input device or GUI 810 or received from I/O device 808.

The processes of FIGS. 24-7 are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 8, which is useful for carrying out a method described with reference to embodiments shown in, for example, FIGS. 2-7. The processes described herein are not limited to the specific embodiments described. For example, the processes of FIGS. 2-7 are not limited to the specific processing order shown in FIGS. 2-7. Rather, any of the blocks of the processes may be re-ordered, combined, or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 8, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 8 shows Program Logic 910 embodied on a computer-readable medium 930 as shown, and wherein the Logic is encoded in computer-executable code configured for carrying out the reservation service process of this invention and thereby forming a Computer Program Product 900. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A computer-implemented method, comprising configuring a storage system comprising a processor in operable communication with a storage device, the storage system responsive to input/output (I/O) requests to the storage device from a host in operable communication with the storage system;

configuring on the storage system first, second, and third tables and first, second, and third respective metadata journals associated with the first, second, and third, tables, each respective metadata journal configured to store respective contents, wherein:

the first table maps a first respective logical address associated with a first respective logical unit number (LUN) associated with the storage device to a corresponding first respective hash digest, the first respective hash digest computed based at least in part on data that resides at the first respective logical address;

the first metadata journal comprises first metadata configured to store information associated with time-based changes to information stored in the first table;

the second table maps a first range of respective hash digests to respective associated physical locations on the storage device;

the second metadata journal comprises second metadata configured to store information associated with time-based changes to information stored in the second table;

the third table comprises a mapping indicative of whether or not a given disk block on the storage device is allocated; and the third respective metadata journal comprises third metadata configured to store information associated with time-based changes to information stored in the third table; and creating, while the storage system is online and responsive to I/O requests from the host, an online system checkpoint comprising information relating to a state of the storage system at a first point in time, the creation of the checkpoint comprising:
  creating a plurality of consistent snapshots of the storage system at the first point in time; and
  destaging, in order, the first metadata journal, the second metadata journal, and the third metadata journal, wherein each destaging is configured to destage information stored in the journal up to the first point in time.

2. The computer-implemented method of claim 1, wherein destaging the first metadata journal further comprises:
  suspending, before destaging the first metadata journal begins, at least one activity capable of changing the contents of the first metadata journal;
  destaging the first metadata journal;
  changing the mapping in the first table to point instead to a first respective artificial hash digest, the first respective artificial hash digest associated with a respective first version of the artificial hash digest, whereby the contents of the first metadata journal that was destaged are protected from alteration after the checkpoint is created; and
  resuming the at least one activity capable of changing the contents of the first metadata journal.

3. The computer-implemented method of claim 2, further comprising:
  defining a predetermined respective artificial hash digest to be a default version of the first respective hash digest; and
  after the first metadata journal is destaged, modifying the mapping in the First table to point instead to the default version of the first respective hash digest.

4. The computer-implemented method of claim 1, further comprising reserving in the storage system a first region of available storage space, the first region of available storage space configured for storing information associated with I/O requests from the host that occur during and after creation of the checkpoint.

5. The computer-implemented method of claim 1, wherein destaging the second metadata journal further comprises:
  disabling, before destaging the second metadata journal begins, at least one activity capable of changing information associated with an existing hash digest to physical layout mapping;
  destaging the second metadata journal; and
  resuming the at least one activity.

6. The computer-implemented method of claim 5, wherein the at least one activity comprises defragmentation.

7. The computer-implemented method of claim 1, further comprising:
  performing, prior to a creation of the online system checkpoint, a defragmentation on at least a first region of storage space on the storage device, the defragmentation freeing a first portion of storage space in the flail respective first region of storage space; and
  redirecting, during and after creation of the online system checkpoint, at least a portion of the host I/O requests away from at least one of the first, second, and third metadata journals, wherein the at least a portion of host I/O requests are instead directed to the first portion of storage space freed by the defragmentation of the first region of available storage space.

8. The computer-implemented method of claim 7, wherein the third metadata journal is not destaged until after host I/O has been configured to be redirected to the first portion of storage space.

9. The computer-implemented method of claim 1, wherein the destaging of the third metadata journal is configured to be able to occur concurrently with host writes.

10. A system, comprising;
  a processor; and
  a non-volatile memory in operable communication with the processor and storing computer program code that when executed on the processor causes the processor to execute a process operable to perform the operations of:
    configuring a storage system responsive to input/output (I/O) requests to the storage device from a host in operable communication with the storage system;
    configuring on the storage system first, second, and third tables and first, second, and third respective metadata journals associated with the first, second, and third, tables, each respective metadata journal configured to store respective contents, wherein:
      the first table maps a first respective logical address associated with a first respective logical unit number (LUN) associated with the storage system to a corresponding first respective hash digest, the first respective hash digest computed based at least in part on data that resides at the first respective logical address;
      the first metadata journal comprises first metadata configured to store information associated with time-based changes to information stored in the first table;
      the second table maps a first range of respective hash digests to respective associated physical locations on the storage device;
      the second metadata journal comprises second metadata configured to store information associated with time-based changes to information stored in the second table;
      the third table comprises a mapping indicative of whether or not a given disk block on the storage device is allocated; and
      the third respective metadata journal comprises third metadata configured to store information associated with time-based changes to information stored in the third table;
    creating, while the storage system is online and responsive to I/O requests from the host, an online system checkpoint comprising information relating to a state of the storage system at a first point in time, the creation of the checkpoint comprising:
      creating a plurality of consistent snapshots of the storage system at the first point in time; and
      destaging, in order, the first metadata journal, the second metadata journal, and the third metadata journal, wherein each destaging is configured to destage information stored in the journal up to the first point in time.

11. The system of claim 10, further comprising computer program code that when executed on the processor causes the processor to execute a process operable to perform the operations of:

suspending, before destaging the first metadata journal begins, at least one activity capable of changing the contents of the first metadata journal;

destaging the first metadata journal;

changing the mapping in the first table to point instead to a first respective artificial hash digest, the first respective artificial hash digest associated with a respective first version of the artificial hash digest, whereby the contents of the first metadata journal that was destaged are protected from alteration after the checkpoint is created; and resuming the at least one activity capable of changing the contents of the first metadata journal.

12. The system of claim 11, further comprising computer program code that when executed on the processor causes the processor to execute a process operable to perform the operations of:

defining a predetermined respective artificial hash digest to be a default version of the first respective hash digest; and after the first and second metadata journals are destaged, modifying the mapping in the first table to point instead to the default version of the first respective hash digest.

13. The system of claim 10, further comprising computer program code that when executed on the processor causes the processor to execute a process operable to perform the operation of reserving in the storage system a first region of available storage space, the first region of available storage space configured for storing information associated with I/O requests from the host that occur during creation of the checkpoint.

14. The system of claim 10, further comprising computer program code that when executed on the processor causes the processor to execute a process operable to perform the operations of:

disabling, before destaging the second metadata journal begins at least one activity capable of changing information associated with an existing hash digest to physical layout mapping;

destaging the second metadata journals; and resuming the at least one activity.

15. The system of claim 10, further comprising computer program code that when executed on the processor causes the processor to execute a process operable to perform the operations of:

performing, prior to a creation of the online system checkpoint, a defragmentation on at least a first region of storage space on the storage device, the defragmentation freeing a first portion of storage space in the respective first region of storage space; and redirecting, during and after creation of the online system checkpoint, at least a portion of the host I/O requests away from at least one of the first, second, and third metadata journals, wherein the at least a portion of host I/O requests are instead directed to the first portion of storage space freed by the defragmentation of the first region of available storage space.

16. The system of claim 15, further comprising computer program code that when executed on the processor causes the processor to execute a process operable to perform the operation of ensuring that the third metadata journal is not destaged until after host I/O has been configured to be redirected to the first portion of storage space.

17. The system of claim 10, further comprising computer program code that when executed on the processor causes the processor to execute a process operable to perform the operations of destaging of the third metadata journal so as to be able to occur concurrently with host writes.

18. A computer program product including a non-transitory computer readable storage medium having computer program code encoded thereon that when executed on a processor of a computer causes the computer to operate a storage system, the computer program product comprising:

computer program code for configuring a storage system comprising a processor in operable communication with a storage device, the storage system responsive to input/output (I/O) requests to the storage device from a host in operable communication with the storage system;

computer program code for configuring on the storage system first, second, and third tables and first, second, and third respective metadata journals associated with the first, second, and third, tables, each respective metadata journal configured to store respective contents, wherein:

the first table maps a first respective logical address associated with a first respective logical unit number (LUN) associated with the storage device to a corresponding first respective hash digest, the first respective hash digest computed based at least in part on data that resides at the first respective logical address;

the first metadata journal comprises first metadata configured to store information associated with time-based changes to information stored in the first table;

the second table maps a first range of respective hash digests to respective associated physical locations on the storage device;

the second metadata journal comprises second metadata configured to store information associated with time-based changes to information stored in the second table;

the third table comprises a mapping indicative of whether or not a given disk block on the storage device is allocated; and the third respective metadata journal comprises third metadata configured to store information associated with time-based changes to information stored in the third table; and computer program code for creating, while the storage system is online and responsive to I/O requests from the host, an online system checkpoint comprising information relating to a state of the storage system at a first point in time, the creation of the checkpoint comprising:

creating a plurality of consistent snapshots of the storage system at the first point in time; and destaging, in order, the first metadata journal, the second metadata journal, and the third metadata journal, wherein each destaging is configured to destage information stored in the journal up to the first point in time.

19. The computer program product of claim 18, further comprising:

computer program code for, before destaging the first metadata journal begins, suspending at least one activity capable of changing the contents of the first metadata journal;

computer program code for destaging the first metadata journal;

computer program code for changing the mapping in the first table to point instead to a first respective artificial hash digest, the first respective artificial hash digest associated with a respective first version of the artificial hash digest, whereby the contents of the first metadata journal that was destaged are protected from alteration after the checkpoint is created; and computer program code for resuming the at least one activity capable of changing the content of the first metadata journal.

20. The computer program product of claim 19, further comprising:

computer program code for defining a predetermined respective artificial hash digest to be a default version of the first respective hash digest; and computer program code for modifying, after the first and second metadata journals are destaged, the mapping in the first table to point instead to the default version of the first respective hash digest.

* * * * *